United States Patent
Carpentier et al.

(10) Patent No.: US 10,649,827 B2
(45) Date of Patent: **\*May 12, 2020**

(54) TWO LEVEL ADDRESSING IN STORAGE CLUSTERS

(71) Applicant: Caringo, Inc., Austin, TX (US)

(72) Inventors: Paul R. M. Carpentier, Boechout (BE); Russell Turpin, Corpus Christi, TX (US)

(73) Assignee: CARINGO INC., Austin, TX (US)

( \* ) Notice: Subject to any disclaimer, the term of this patent is extended or adjusted under 35 U.S.C. 154(b) by 134 days.

This patent is subject to a terminal disclaimer.

(21) Appl. No.: 15/934,574

(22) Filed: Mar. 23, 2018

(65) Prior Publication Data

US 2018/0210777 A1    Jul. 26, 2018

Related U.S. Application Data

(60) Continuation of application No. 14/815,889, filed on Jul. 31, 2015, now Pat. No. 9,952,918, which is a
(Continued)

(51) Int. Cl.
*G06F 11/00* (2006.01)
*G06F 11/07* (2006.01)
(Continued)

(52) U.S. Cl.
CPC .......... *G06F 11/0709* (2013.01); *G06F 3/061* (2013.01); *G06F 3/0604* (2013.01);
(Continued)

(58) Field of Classification Search
CPC ............ G06F 11/0709; G06F 11/2084; G06F 11/0727; G06F 11/20; G06F 11/2053;
(Continued)

(56) References Cited

U.S. PATENT DOCUMENTS 5,740,465 A     4/1998  Matsunami et al.
5,918,229 A *   6/1999  Davis .................... G06F 9/5016
                                                          711/147
(Continued)

OTHER PUBLICATIONS

International Search Report in PCT/US2013/44042 dated Aug. 30, 2013.
(Continued)

*Primary Examiner* — Joseph D Manoskey
(74) *Attorney, Agent, or Firm* — Beyer Law Group LLP

(57) ABSTRACT

Digital objects are stored and accessed within a fixed content storage cluster by using a page mapping table and a pages index. A stream is read from the cluster by using a portion of its unique identifier as a key into the page mapping table. The page mapping table indicates a node holding a pages index indicating where the stream is stored. A stream is written by storing the stream on any suitable node and then updating a pages index stored within the cluster responsible for knowing the location of digital objects having unique identifiers that fall within a particular address range. The cluster recovers from a node failure by first replicating streams from the failed node and reallocating a page mapping table to create a new pages index. The remaining nodes send records of the unique identifiers corresponding to objects they hold to the new pages index.

24 Claims, 10 Drawing Sheets

Related U.S. Application Data division of application No. 14/200,183, filed on Mar. 7, 2014, now Pat. No. 9,128,833, which is a continuation of application No. 13/517,523, filed on Jun. 13, 2012, now Pat. No. 9,104,560.

(51) Int. Cl.
| | |
|---|---|
| *G06F 3/06* | (2006.01) |
| *G06F 11/20* | (2006.01) |
| *G06F 12/1009* | (2016.01) |
| *H04L 12/741* | (2013.01) |
| *H04L 29/08* | (2006.01) |

(52) U.S. Cl.
CPC .............. *G06F 3/064* (2013.01); *G06F 3/067* (2013.01); *G06F 3/0607* (2013.01); *G06F 3/0613* (2013.01); *G06F 3/0626* (2013.01); *G06F 3/0635* (2013.01); *G06F 3/0659* (2013.01); *G06F 3/0667* (2013.01); *G06F 3/0683* (2013.01); *G06F 11/2084* (2013.01); *G06F 12/1009* (2013.01); *H04L 45/745* (2013.01); *H04L 67/1097* (2013.01); *G06F 2212/206* (2013.01)

(58) Field of Classification Search
CPC .............. G06F 11/2056; G06F 11/2094; G06F 3/0604; G06F 3/0607; G06F 3/061; G06F 3/0613; G06F 3/0626; G06F 3/0635; G06F 3/064; G06F 3/0659; G06F 3/0667; G06F 3/067; G06F 3/0683; G06F 12/1009; G06F 2212/206; H04L 67/1097; H04L 45/745
See application file for complete search history.

(56) References Cited

U.S. PATENT DOCUMENTS

| | | | |
|---|---|---|---|
| 5,978,791 A | 11/1999 | Farber et al. | |
| 6,415,280 B1 | 7/2002 | Farber et al. | |
| 6,922,766 B2 | 7/2005 | Scott | |
| 6,928,442 B2 | 8/2005 | Farber et al. | |
| 7,284,088 B2 | 10/2007 | Frolund et al. | |
| 7,373,345 B2 | 5/2008 | Carpentier et al. | |
| 7,552,356 B1 | 6/2009 | Waterhouse et al. | |
| 7,647,329 B1 | 1/2010 | Fischman et al. | |
| 7,681,105 B1 | 3/2010 | Sim-Tang et al. | |
| 7,734,603 B1 | 6/2010 | McManis | |
| 7,802,310 B2 | 9/2010 | Farber et al. | |
| 7,945,539 B2 | 5/2011 | Farber et al. | |
| 7,945,544 B2 | 5/2011 | Farber et al. | |
| 7,949,662 B2 | 5/2011 | Farber et al. | |
| 7,979,645 B2 | 7/2011 | Motohashi | |
| 7,996,636 B1 * | 8/2011 | Prakash | G06F 3/0619 711/162 |
| 8,001,096 B2 | 8/2011 | Farber et al. | |
| 8,090,792 B2 | 6/2012 | Dubnicki et al. | |
| 8,296,515 B1 | 10/2012 | Saxena et al. | |
| 8,504,535 B1 | 8/2013 | He et al. | |
| 2002/0169938 A1 | 11/2002 | Scott et al. | |
| 2003/0135700 A1 | 6/2003 | Schultz et al. | |
| 2004/0153841 A1 | 8/2004 | Beck | |
| 2004/0255002 A1 | 12/2004 | Kota et al. | |
| 2004/0260906 A1 | 12/2004 | Landin et al. | |
| 2005/0005074 A1 | 1/2005 | Landin et al. | |
| 2005/0044340 A1 | 2/2005 | Sheets et al. | |
| 2005/0091451 A1 | 4/2005 | Frolund et al. | |
| 2005/0091556 A1 | 4/2005 | Frolund et al. | |
| 2005/0283537 A1 | 12/2005 | Li et al. | |
| 2006/0069899 A1 | 3/2006 | Schoinas et al. | |
| 2008/0140947 A1 | 6/2008 | Silk et al. | |
| 2008/0243773 A1 * | 10/2008 | Patel | G06F 11/1076 |
| 2008/0247355 A1 | 10/2008 | Ahn | |
| 2009/0006888 A1 | 1/2009 | Bernhard et al. | |
| 2009/0089537 A1 | 4/2009 | Vick et al. | |
| 2009/0228511 A1 | 9/2009 | Atkin et al. | |
| 2010/0070515 A1 | 3/2010 | Dutton et al. | |
| 2010/0084506 A1 | 4/2010 | Meinberg Macedo et al. | |
| 2010/0235409 A1 | 9/2010 | Roy et al. | |
| 2011/0029840 A1 | 2/2011 | Ozzie et al. | |
| 2011/0040568 A1 | 2/2011 | Dutton et al. | |
| 2011/0138136 A1 | 6/2011 | Shitomi et al. | |
| 2011/0154092 A1 | 6/2011 | Dash et al. | |
| 2011/0167045 A1 | 7/2011 | Okamoto | |
| 2012/0017037 A1 | 1/2012 | Riddle et al. | |
| 2012/0042202 A1 | 2/2012 | Wenzel | |
| 2012/0047111 A1 | 2/2012 | Hayden et al. | |
| 2012/0060072 A1 | 3/2012 | Simitci et al. | |
| 2012/0084506 A1 | 4/2012 | Colgrove | |
| 2012/0266044 A1 | 10/2012 | Hu et al. | |
| 2013/0159251 A1 | 6/2013 | Skrenta et al. | |

OTHER PUBLICATIONS

Written Opinion in PCT/US2013/44042 dated Aug. 30, 2013.
International Search Report in PCT/US2013/44045 dated Sep. 25, 2013.
Written Opinion in PCT/US2013/44045 dated Sep. 25, 2013.
International Search Report in PCT/US2013/043904 dated Oct. 10, 2013.
Written Opinion in PCT/US2013/043904 dated Oct. 10, 2013.
Office Action in U.S. Appl. No. 13/517,527, dated Feb. 7, 2014.
Notice of Allowance in U.S. Appl. No. 13/517,525, dated Apr. 4, 2014.
Office Action in U.S. Appl. No. 13/517,523, dated May 15, 2014.
Notice of Allowance in U.S. Appl. No. 13/517,527, dated Apr. 23, 2014.
Office Action in U.S. Appl. No. 13/517,523, dated Oct. 22, 2014.
Notice of Allowance in U.S. Appl. No. 13/517,523, dated Mar. 30, 2015.
Office Action in U.S. Appl. No. 14/320,494, dated Apr. 9, 2015.
Notice of Allowance in U.S. Appl. No. 14/320,494, dated May 20, 2015.
European Search Report in EP No. 13803882.3, dated Feb. 16, 2016.
Restriction Requirement in U.S. Appl. No. 14/788,664, dated Mar. 7, 2016.
Office Action in U.S. Appl. No. 14/788,664 dated May 18, 2016.

* cited by examiner

Disk-to-Node Mapping Table

Node Status Table

| UID Range | Node | Change? |
|---|---|---|
| 0 | 50 | ✓ |
| 1 | 50 | |
| 2 | 20 | ✓ |
| ⋮ | ⋮ | |
| A | 20 | |
| B | 30 | |
| C | 40 | |
| D | 40 | |
| E | 90 | ✓ |
| F | 20 | |

Page Mapping Table

FIG. 10

TWO LEVEL ADDRESSING IN STORAGE CLUSTERS

CROSS-REFERENCE TO RELATED APPLICATIONS

This application is a continuation of U.S. patent application Ser. No. 14/815,889 filed Jul. 31, 2015, entitled "Two-Level Addressing in Storage Clusters, which is a divisional of U.S. patent application Ser. No. 14/200,183 filed Mar. 7, 2014 (now U.S. Pat. No. 9,128,833), entitled "Two-Level Addressing in Storage Clusters," which is a continuation of U.S. patent application Ser. No. 13/517,523 filed Jun. 13, 2012 (now U.S. Pat. No. 9,104,560), entitled "Two-Level Addressing in Storage Clusters," all of which are hereby incorporated by reference. Additionally, this application is related to U.S. patent application Ser. No. 13/517,525 (now U.S. Pat. No. 8,762,353), entitled "ELIMINATION OF DUPLICATES IN STORAGE CLUSTERS" and to U.S. patent application Ser. No. 13/517,527 (Now U.S. Pat. No. 8,799,746), entitled "ERASURE CODING AND REPLICATION IN STORAGE CLUSTERS," both of which are hereby incorporated by reference.

FIELD OF THE INVENTION

The present invention relates generally to data storage and retrieval. More specifically, the present invention relates to data storage and retrieval in a fixed-content storage cluster.

BACKGROUND OF THE INVENTION

Historically, computer files (or more generally, digital objects) have been stored in file systems. These file systems have typically been hierarchical, and have allowed files to be inserted, removed or retrieved according to a particular schema. Usually, such a file system is implemented using a B-tree and objects are stored along with metadata such as a file name and other attributes. The file identifier often conforms to a regular hierarchical path and files are stored and retrieved using path names.

This model of storing files, though, is reaching its limits as massive amounts of information are now being required to be stored within file systems. A single computer may store millions of files and computer servers in large networks may be required to store many times that amount of information. While a B-tree implementation (for example) may work fine with many thousands of files, a file system may process requests much more slowly as the number of files increase. New techniques of storing information have accordingly been developed.

For instance, Caringo, Inc. of Austin, Tex. has developed a technique where digital objects are stored in a flat address space across any number of computer nodes in a storage cluster. A unique identifier for each object (such as a random number, for example) is used to add the digital object to, or retrieve it from, the storage cluster. When an object is requested by an application, a unique multicast technique is used to send a message to all nodes within the cluster to find the object. Similarly, storing an object also involves sending a message to all nodes to find a suitable storage location, meaning that the object might be stored on any of the nodes. Although this technique is efficient, it can also be affected by the increase in the amount of information that needs to be stored within a cluster.

Accordingly, improvements are desired in the area of storage and retrieval of objects in storage clusters.

SUMMARY OF THE INVENTION

To achieve the foregoing, and in accordance with the purpose of the present invention, a two-level addressing scheme is disclosed that reduces the impact of storing and retrieving objects in a storage cluster.

Advantageously, by using a page mapping table and a pages index which are both stored in random access memory of one or more nodes in order to determine on which node a particular digital object is located, finding a digital object puts less load on the storage cluster overall and uses less CPU time of the individual nodes. In fact, in order to obtain the address on disk of a particular digital object within a storage cluster, even though there may be many billions of objects stored within the cluster, not a single disk access is needed. In addition, using more RAM in order to determine the location of digital objects speeds up access time. Further, access time for any particular digital object is independent of the size of the storage cluster.

In a first embodiment, a unique identifier received from a client application is used to retrieve a digital stream from the storage cluster. A portion of the unique identifier is used as a key into a page mapping table in order to determine a secondary node that stores a pages index. The pages index knows which nodes store the digital objects that are identified by unique identifiers beginning with the portion of the unique identifier used as a key. Using the pages index, nodes that hold digital objects having a unique identifier beginning with the portion identified and requested to confirm whether or not they hold a digital object corresponding to the unique identifier. If so, the node with the digital object reads the stream and supplies it to the requesting client application.

In a second embodiment, a client application accesses a primary node within the cluster which then chooses a secondary node for writing the digital stream from the client application. The stream is sent to the secondary node and written to disk. The secondary node updates its disk index in RAM of which unique identifiers corresponding to objects that it stores. The secondary node also sends a record including the unique identifier and an identifier of the secondary node to a node within the cluster having a pages index which keeps track of which nodes store digital objects within an address range which includes the unique identifier.

In a third embodiment, the storage cluster recovers from a node failure by first replicating digital streams that had been stored upon the failed node and storing those streams on other nodes within the cluster. A coordinator node reallocates a page mapping table by choosing another node to hold the pages index that had been held by the failed node. The coordinator node sends the page mapping table to all remaining nodes within the cluster and each node examines its disk index in RAM to locate streams corresponding to the pages index. The remaining nodes send sets of records to the new node holding the pages index indicating unique identifiers of digital objects held by the remaining nodes that should be indexed by the pages index.

In a fourth embodiment a new node is added to a storage cluster. A coordinator node reallocates its page mapping table and assigns a pages index from one of the original nodes to the new node. The page mapping table is sent to all nodes within the cluster. Each node examines its disk index in RAM to locate digital streams corresponding to the pages index. These nodes send records with the unique identifiers of these digital streams to the new node for inclusion in its pages index.

BRIEF DESCRIPTION OF THE DRAWINGS

The invention, together with further advantages thereof, may best be understood by reference to the following description taken in conjunction with the accompanying drawings in which:

FIG. 10 illustrates a modified page mapping table for use during node failure and when adding a node.

DETAILED DESCRIPTION OF THE INVENTION

Figure 1:
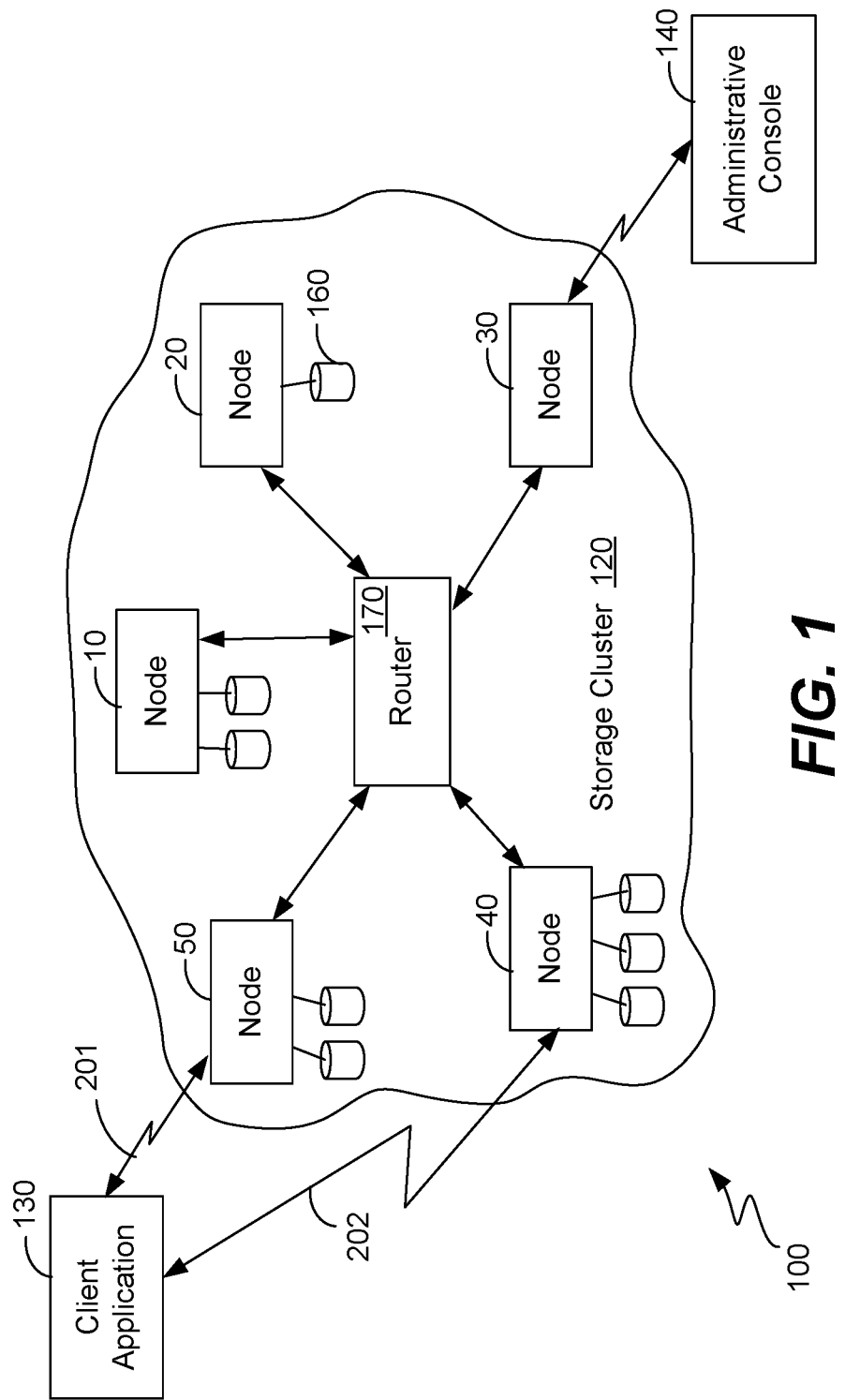
FIG. 1 illustrates an environment for operation of the present invention.

As mentioned above, improvements are desired in the management of objects within storage clusters. It is realized that the multicast technique can be inefficient as the storage cluster and the number of objects it stores grows in size.

By way of illustration, consider that an application requesting a file (identified by a unique identifier) from a storage cluster sends a request to a node within the cluster that then multicasts this request to all other nodes within the cluster. Each node then interrupts what it is doing, searches its RAM index for the unique identifier received, and either responds "No, not here" or does not respond and returns from its interrupt. Storing a file identified by a unique identifier involves a similar multicast technique in which each node is interrupted and responds with whether or not it is able (or how much it would cost) to store the file. While this multicast technique is simple, elegant and reliable, it is realized that scaling can be problematic.

While some implementations may function fine with up to thousands of nodes, there comes a point when each node may be handling many thousands of requests a second to look for a file or to store file, each request causing the node to interrupt what it is doing. These interruptions not only slow down the storage and retrieval of files, but also slow down the internal processing required of each node such as integrity checking, duplication of objects, etc. Accordingly, it is realized that an improved technique not relying upon sending file write and file request messages to every single node within the cluster would be desirable.

Another technique that has been considered is to spread the storage of objects over the available nodes using the value of the unique identifier, rather than randomly distributing the objects, relying solely upon a bidding process, or using a characteristic of the node to assign it a digital object. In other words, since the universally unique identifiers (e.g., one generated using a hash function or a random number generator) of the stored digital objects are likely to be spread evenly over the address space, one may assign a digital object to a particular node based upon the value of its unique identifier. For example, in the simple case of a storage cluster with two nodes, if the binary representation of the unique identifier of a digital object begins with the bit "0" then the object is stored on the first node, while those objects whose identifiers begin with the bit "1" are stored on the second node. Of course, this technique may divide up the address space amongst any number of nodes within a cluster. In this way, the cluster would know which node stores which digital objects based upon its unique identifier.

It is realized, though, that this pre-allocation of content within a storage cluster can be problematic in that large amounts of data would need to be redistributed if a node is added or deleted. Accordingly, an improved technique would be desirable.

Storage Cluster Example

As mentioned above, the present invention applies to digital objects, i.e., any type of information represented in digital form. For instance, a digital object may be an electronic representation of information such as a computer file, a group of files, a group of file identifiers, or the collections of data or database information. Such other collections of data include frames or clips from digital audio or video streams, digital photographs, scanned paper documents, voice messages, CAD/CAM designs, MRI or X-ray data, streams from message records or files, log entries from audits or status logs of systems, e-mail archives, check images, etc. The term "computer file" is often used herein to encompass any electronic representation of information.

The present invention may be implemented using any suitable computer hardware and software, and may be implemented upon a storage cluster that includes any number of computer nodes. Preferably, each node includes a CPU (or multiple CPUs), an operating system, communication links to the other nodes (or, to at least a central router), and any number of hard disk or solid-state drives (i.e., from zero to N) or other persistent data storage devices. Typically, each node includes at least one drive and there may be any combination of hard disk drives along with solid-state drives. A storage cluster is typically a fixed-content cluster, often referred to as WORM (write once, read many) storage, meaning that once a computer file or digital object is written to the cluster it cannot be changed. (Of course, the file may be deleted and a modified version of the computer file may also be stored within the cluster.) A cluster may be implemented as a redundant array of independent nodes (a RAIN) meaning that each node runs its own operating system and makes independent decisions about storage within the cluster. Storage clusters may be built upon blades, towers, personal computers and servers. Alternatively, a multi-core processor within a single computer box may support a virtual storage node running on each core, meaning that a storage cluster having multiple nodes may be present within the single computer box. Further, a computer system inside a single physical box may include multiple CPUs in which case each CPU may represent a node and the storage cluster may be implemented within the single physical box.

FIG. 1 illustrates an environment 100 for operation of the present invention. Included is a storage cluster 120, a client application 130, an administrative console 140, any number of computer nodes 10-50, and a central router 170. As mentioned above, a computer node is typically a physical file server that preferably includes at least one CPU and any number of disk drives 160, solid-state drives or hybrid drives that have both types. Each node implements an operating system such as Debian Linux and executes processes to manage peer-to-peer communications between nodes, to perform health processing, and to make independent decisions on behalf of the node and its volumes. Each node also includes administrative software and its status can be viewed via a web browser over the Internet.

In one particular RAIN embodiment, each node is a 1U server (e.g., an x86 computer) with 1 terabyte or more of serial ATA disk storage capacity with standard Ethernet networking. Each node has an IP address and may be physically interconnected using an IP-based LAN, MAN or WAN. Thus, each node may talk to a single node or may broadcast a message to all nodes within the storage cluster (a multicast) using a router 170 or other similar network switch.

Each node includes a management module for handling external requests from client applications (e.g., an SCSP request from client 130), replication requests between nodes (e.g., interSCSP requests), and other internode protocol communications (bidding, requests for information, etc.). A health processing module manages the digital content of each node. The administrative console 140 is preferably a Web server linked to the storage cluster that allows access to each node over any suitable Internet connection. Each node implements a redundant administrative console which can be used to view and administer the entire cluster.

In one embodiment, a storage cluster may be implemented using content storage software available from Caringo, Inc. of Austin, Tex. (modified as described herein), and any suitable computer hardware. In this embodiment, a storage cluster implements fixed-content content-addressable storage and each digital object is uniquely addressed within the cluster by a random number (a universally unique identifier, or UUID) that has been generated for that digital object using a random number generator. The contents of each digital object may be verified using a hash function. A client software application receives the UUID when storing a digital object in the cluster and retrieves that digital object by supplying the UUID to the cluster. In another embodiment, each digital object is uniquely addressed within the cluster by a hash value (a unique identifier) that has been calculated for that digital object using a hash function. Software applications communicate with a CAStor cluster using standard HTTP 1.1, and more specifically, using a simplified subset of that standard called Simple Content Storage Protocol (SCSP). Using this standard interface, client applications such as electronic mail, enterprise content management, health care applications, Web browsers, Web 2.0 sites, photo sharing, social media sites, security video, video editing, etc., may access the CAStor storage cluster in order to store files, retrieve files or delete files. Further, direct HTPP access is available for browsers, JAVA, Python, C++, and other software environments.

In one embodiment, a digital object is stored on a particular node in the following way. Each node includes a disk index in RAM listing where a digital stream including the object is stored on disk on the node based upon its unique identifier. For example, a first column of the index lists the universally unique identifier of the object, a second column lists at which sector the stream starts and a third column lists either the length of the stream or the sector in which it ends. A stream may include the digital object as well as relevant metadata. Accordingly, objects to be stored on a node may simply be written sequentially to the disk and their locations recorded in the RAM index. Or, objects may be stored anywhere on the disk using any suitable storage algorithm and the objects' locations again will be recorded in the index. When an object is to be read or deleted, its location on the disk may be found by consulting this index. To facilitate building up this RAM index upon a restart of the node, a journal of the node stored within persistent storage records whenever an object is added or deleted and includes the unique identifier for the object, the sector at which it starts and its length in sectors or bytes. Accordingly, when the node is restarted the information in the journal is read and is used to create the disk index in RAM. Another technique to build up the index instead of using a journal is to read the entire disk upon a restart in order to gather the necessary information although this will be more time consuming.

For data redundancy, objects may be stored using replication, erasure coding, or both, as described in "Erasure Coding and Replication in Storage Clusters" referenced above.

Designated Coordinator Node

In certain embodiments, all nodes are considered equal and communicate with each other by periodically broadcasting (or multicasting) their relevant information to all other nodes within the cluster. In a preferred embodiment, at any given point in time one of the nodes is designated the coordinator node and assumes the role of gathering relevant information from all nodes and then distributing that information periodically. It is desirable that only one node at a time may be the designated coordinator node, although there may be a backup coordinator node ready to be put into service if needed, and the role of the coordinator node may be transferred from node to node periodically, such as every few minutes.

Accordingly, each node within the cluster periodically transmits to the designated coordinator node information such as: how busy the node is, how full the disks drives of that node are, the type of disk drives available, the amount and percentage of RAM available, whether the node has newly been added, the volume identifiers for the disks it includes, and any other relevant information. The designated coordinator node assembles this information from each node, creates or updates the disk-to-node mapping table 810, updates the node status table 860, updates its page mapping table, and then broadcasts this information to all nodes periodically in a single multicast message, such as every second. This process is more efficient as it uses less broadcasting (thus, fewer CPU interrupts) while relating the same information.

Page Mapping Table and Pages Index

It is realized that a novel technique for storing and retrieving digital objects from a storage cluster should be fast, should avoid interrupting nodes when possible, should allow addition and deletion of nodes without massive redistribution of data, and should have the capability to allow objects to be distributed amongst the cluster using bidding, randomly, capacity of nodes, or other information. Accordingly, the present invention uses a combination of a table and indexes in order to store and retrieve digital objects. Instead of pre-allocating digital objects to a particular node based upon the unique identifiers, a particular address range of unique identifiers is allocated to a particular node, and, this node will not necessarily store the digital objects of that address range, but will know on which node the objects are stored. Thus, a page mapping table on a node points to any number of pages indexes, each pages index actually holding the information regarding on which node a particular digital object is stored. In this fashion, if nodes are deleted or added, only pointers in RAM need be moved around, not entire files on disk.

Figure 2:
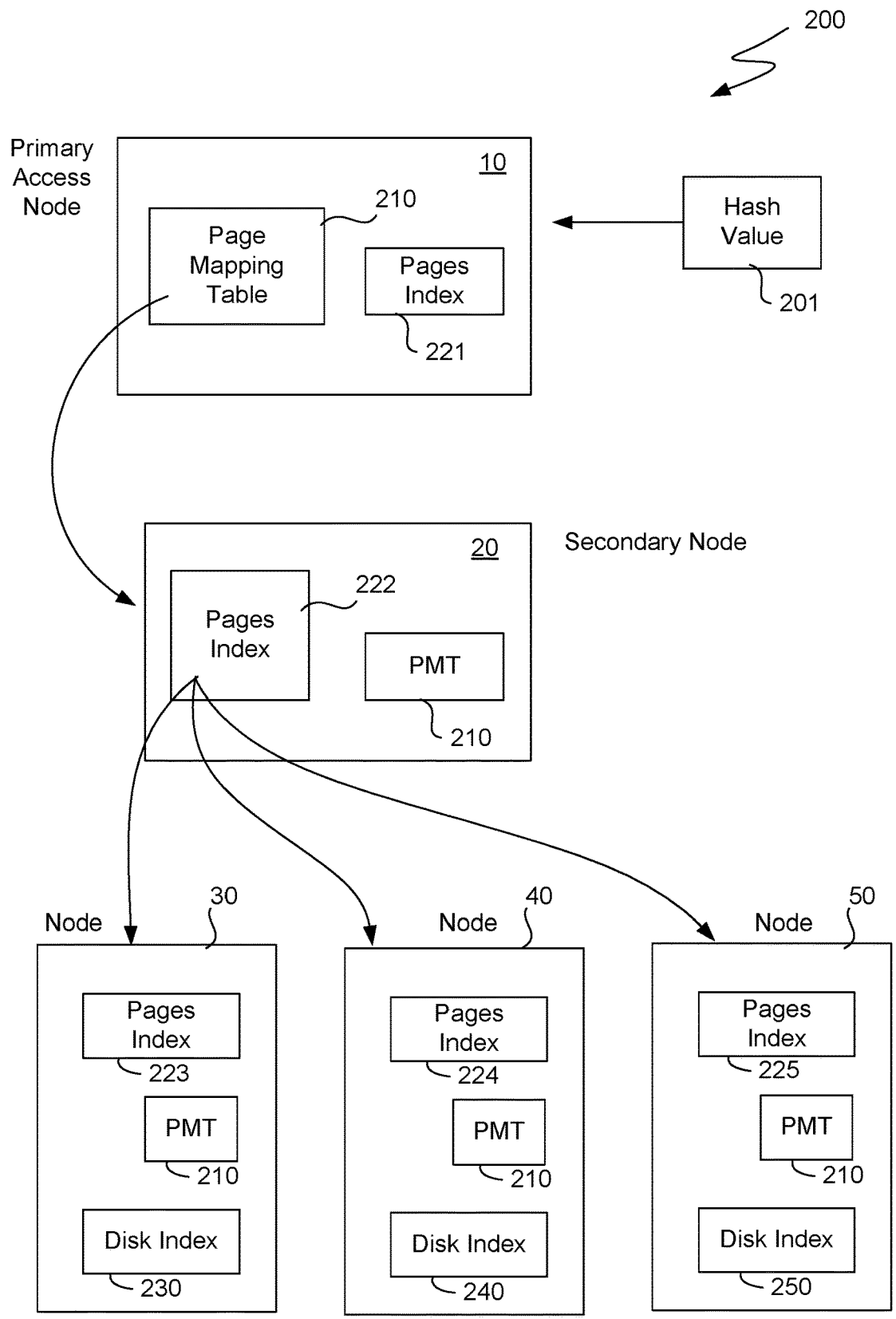
FIG. 2 is a block diagram showing computer nodes from FIG. 1.

FIG. 2 is a block diagram 200 showing computer nodes 10-50 from FIG. 1. This figure illustrates, at a high level, how the page mapping table and pages index may be used to find a particular computer file within a storage cluster. Each node includes the page mapping table 210 which is the same for each node. It is not required that the page mapping table be present on each node, but doing so increases efficiency and allows a client application to contact any node of the cluster regarding a particular digital object. Preferably, the page mapping table is distributed to all nodes periodically, especially after it is updated. Each node also includes a pages index 221-225 which will be different for each node. Also, each node includes a disk index in RAM that, given a particular unique identifier, indicates precisely where on disk the identified digital object is stored.

Essentially, searching for a file (for example) in a storage cluster identified by a particular unique identifier 201 is a three-step process. The unique identifier is first used on a primary access node 10 of the cluster to consult a page mapping table 210. The unique identifier is treated as an address, and the page mapping table maps that address to a particular secondary node, in this case, node 20. The page mapping table does not know on which node the digital object is stored based upon the address, but it does know which node will know—the secondary node. Each possible address indicated by a unique identifier is mapped to one of many secondary nodes. In other words, each pages index is responsible for a discrete address range of all the possible addresses available using the unique identifier. Thus, while a unique identifier indicating a particular address might be mapped to pages index 222 on node 20, a different unique identifier indicating a different address (in a different address range) might very well be mapped to a different pages index 223 on node 30, etc. There is no requirement that each node within the cluster hold one of the pages indexes, but it is preferable. In fact, each node will likely be responsible for more than one address range.

The secondary node 20 does not necessarily hold the digital object identified by the unique identifier, but will know which node does hold the digital object. Using the unique identifier (or a partial identifier) on the secondary node 20, the pages index 222 is consulted in order to determine which node likely does hold the digital object identified by the unique identifier. In this example, the pages index 222 indicates that each of nodes 30, 40 and 50 does hold a copy of the digital object (possibly because an attribute of the digital object requires that three copies should be kept within the cluster). One of these final nodes 30-50 may then be accessed and the unique identifier is used in one of the disk indexes 230-250 of the final node in order to determine where the digital object is located on the disk of that node. Techniques for writing a digital object to the cluster, for deleting an object, and for dealing with situations where a node drops out or is added, also make use of the page mapping table and pages indexes and will be described below.

Accordingly, no more than three nodes (or possibly more nodes in the case where partial identifiers are used) need be accessed in order to find an object. It is also possible that the pages index is located on the same node which holds the page mapping table, and that the digital object is also located upon this node. In this situation only one node need be accessed. It is also possible that more than one copy of a particular object is stored within the cluster (depending upon an attribute of the object); in this situation, the pages index would indicate the nodes holding each of those copies. In addition, if partial identifiers are used, the pages index might indicate a certain number of nodes where it is believed a copy of the digital object is stored, but not all of these nodes would actually have a copy of the object.

In one embodiment, in order to save RAM, the pages index of objects on a particular disk is not built up using the entire 128-bit identifier for each object, but uses a partial identifier (for example, the first 4 or 5 bytes of the unique identifier) in order to indicate whether or not the object is present on the node. Once it is believed that the object is found, then a final check may be made in the disk index in RAM using the full unique identifier to verify that the node is the correct one. Even though this technique may result in occasional uncertainty and a very slight decrease in performance, it provides a significant advantage in that it uses less RAM.

Figure 3:
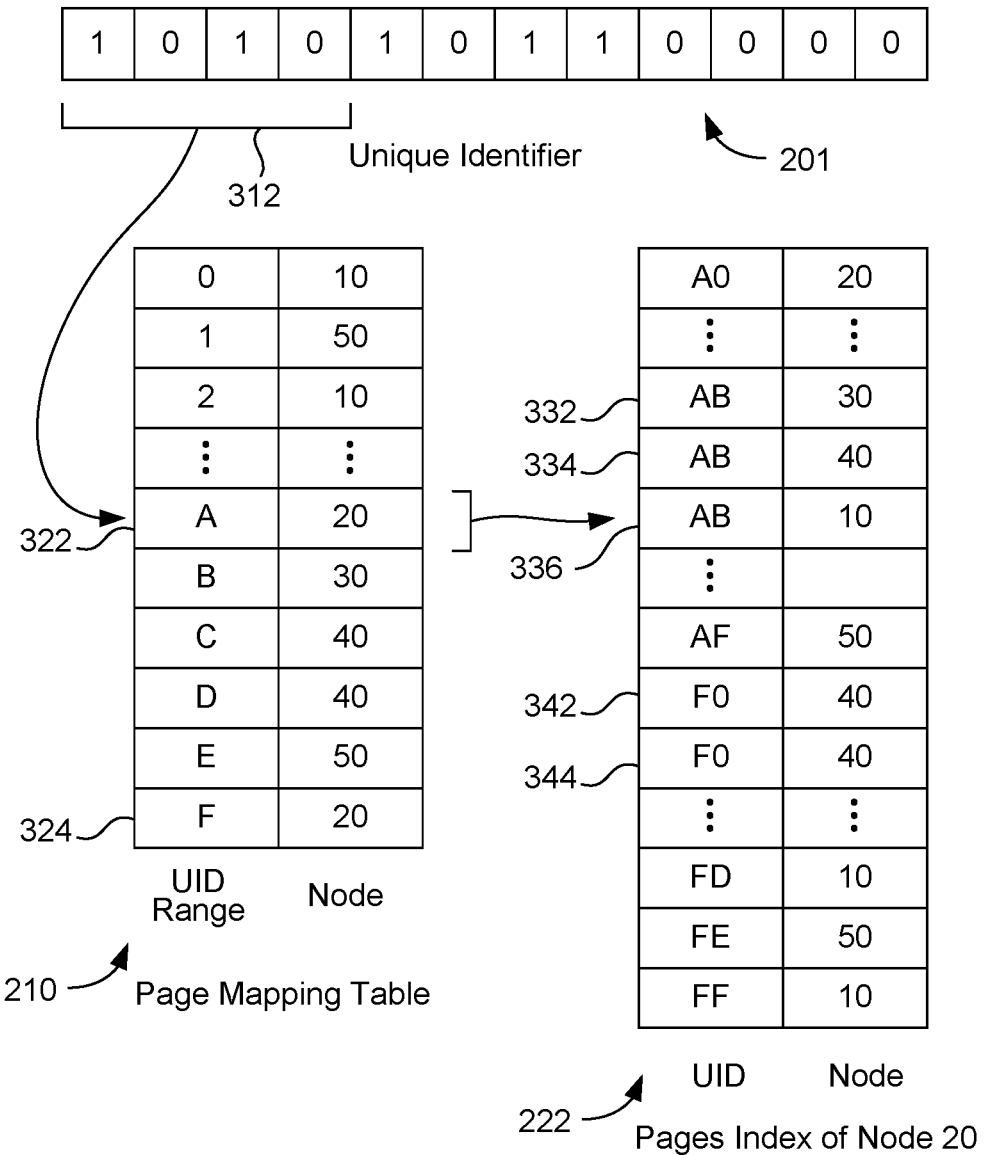
FIG. 3 illustrates a more detailed example of finding an object identified by a unique identifier.

FIG. 3 illustrates a more detailed example of finding an object identified by a unique identifier. In this example, a client application has provided a unique identifier 201 and is attempting to find the digital object corresponding to this identifier in the storage cluster. Although this example identifier is shown having only 12 bits, typically a unique identifier may have a much greater number of bits, such as 128 bits. In this example, the first four bits 312 of the identifier are used to divide up the potential address space addressed by the 12-bit identifier into 16 different address ranges, or pages. In other words, the first four bits represent a possible number from 0 up to 15, or from 0-9 and A-F in hexadecimal. Each of these hexadecimal digits then represents a possible address range that will be used as key into the page mapping table 210. Of course, fewer or greater than four bits of the unique identifier may be used as an index into the page mapping table, fewer bits resulting in a much shorter index, while a greater number of bits resulting in an exponentially larger page mapping table. Because RAM is relatively inexpensive, a greater number of bits for key 312 is likely to be used, with 16 to 24 bits being a reasonable number.

As shown, the page mapping table 210 includes a first column, UID Range, listing each hexadecimal digit that could possibly be identified by the four bits at 312. The second column of the page mapping table lists the particular node holding the pages index that indicates where the digital object represented by the unique identifier is stored. In other words, the second column does not indicate where the digital object is stored, but indicates a node that knows where the digital object is stored. As shown, because bits 312 represent the digit A, this provides an index into row 322 indicating that it is node 20 that knows where the digital objects are stored whose unique identifiers begin with the hexadecimal digit A. Note that it is possible for more than one address range to be stored on a particular node. For example, rows 322 and 324 indicate that node 20 has a pages index that stores the location of digital objects whose unique identifiers begin with A and with F. Even though the second column lists all nodes of the example cluster 120, is not required that each node keep a pages index, although that is preferable. Accordingly, the key into the page mapping table indicates that the pages index 222 of node 20 has information indicating the storage location of the digital object identified by unique identifier 201.

As shown, pages index 222 has a first column listing the unique identifiers of digital objects that begin with either A or F, and a second column indicating the nodes where these digital objects may be found. The contents of these columns may be varied depending upon implementation details. For example, it is possible that the first column will list the entire unique identifier (i.e., the entire 12 bits of this example, or the entire 128 bits in the preferred embodiment) rather than a partial unique identifier as shown. Listing the entire unique identifier will greatly increase the size of the pages index, while listing a portion (e.g., the first 48 bits, or the first 8 bits in this example) will result in a smaller index at the expense of uncertainty regarding the exact location of a digital object. This example lists the first 8 bits of possible unique identifiers. Unique identifier 201 has the hexadecimal value AB0, and rows 332-336 indicate that digital objects whose unique identifiers begin with the digits AB may be found on nodes 30, 40 and 10. In this example, three nodes are listed because it is possible that this particular digital object has a metadata requirement that three copies be kept within the cluster.

It is also possible that three nodes are listed in rows 332-336 even though the metadata requirement indicates that only a single copy be kept of each digital object. In this situation, it is possible that there are three digital objects having unique identifiers AB0, AB4 and ABE, and that these digital objects are kept on nodes 30, 40 and 10. Accordingly, rows 332-336 correctly indicate that digital objects having unique identifiers beginning with "AB" are stored on these nodes. This situation illustrates the uncertainty that is possible when partial unique identifiers are used in the first column. When searching for a particular digital object in this situation, it may be necessary to check each of nodes 30, 40 and 10 before the correct digital object is found. Even though there is some uncertainty in this embodiment when partial unique identifiers are used, the number of multiple nodes that need be checked can remain small, and the length of the pages index can be kept manageable. In addition, determining whether a particular digital object is present upon a node only involves comparing the unique identifier 201 with the disk index in RAM of each node, rather than requiring a disk access. Therefore, in a preferred embodiment, partial unique identifiers are used in the first column and a suitable length for these partial identifiers is 32 to 48 bits.

In certain embodiments, the length of the partial identifier can be chosen (or automatically set) to be proportional to the cluster object count, thus reducing the likelihood that the partial identifier would indicate that an object in question might be stored upon any of the nodes within the cluster.

Row 342 of the pages index also shows another implementation detail. If a digital object whose unique identifier begins with the characters F0 is stored at node 40 then a row 342 will be added to the pages index as shown. And, when another object whose unique identifier also begins with the characters F0 is stored at node 40 then duplicate row 344 will also be added to the pages index even though the two rows are exactly the same. And, this will be the case even if the two rows are referring to two copies of the same digital object having the same unique identifier. In this manner, is not necessary for any node to scan its pages index when adding a new row. The new row is simply added without regard as to whether a duplicate row already exists. The index may also be implemented such that duplicate rows are not allowed.

Although the second column of the pages index lists the nodes upon which particular digital objects may be found, in one preferred embodiment it is not the nodes that are listed in the second column, but a unique identifier for each disk within the cluster. In other words, each row of the pages index would indicate for a particular unique identifier (or for a partial identifier) the specific disk within the cluster where the digital object is located. Once the unique identifier for the disk is found, then a disk-to-node mapping table stored in RAM in each node is then used to map that disk identifier to the actual node where the disk is located. The system may then access that node to retrieve the object or determine if the object is actually present on that disk. This embodiment is used in implementations where disks might be moved to different nodes within a cluster. The mapping table is regularly updated by the designated coordinator node.

Figure 8:
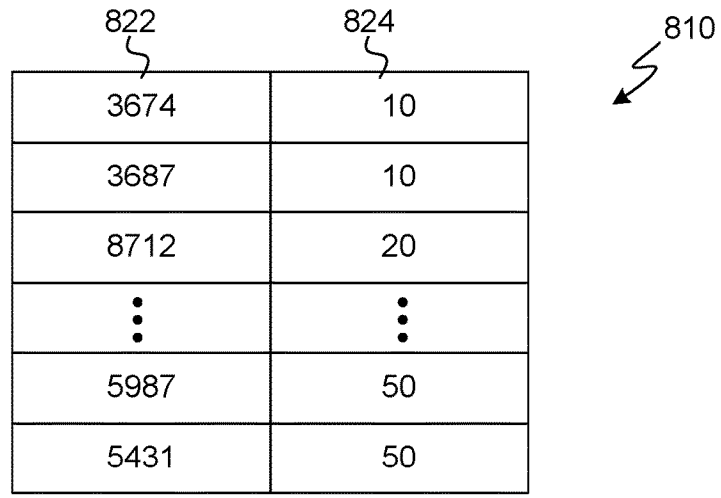
FIG. 8 illustrates a suitable disk-to-node mapping table.

FIG. 8 illustrates a suitable disk-to-node mapping table 810. As shown, a first column 822 indicates a unique identifier for each disk within the storage cluster and a second column 824 indicates the node on which that particular disk is located. Not all of the disks and nodes are shown in this abbreviated table. If disks are added to or removed from the cluster, if disks are moved to different node, or if nodes are added to or removed from the cluster, then this mapping table will be updated and the designated coordinator node will send out an updated version of the mapping table to all nodes.

Reading a Stream from the Cluster

Figure 4:
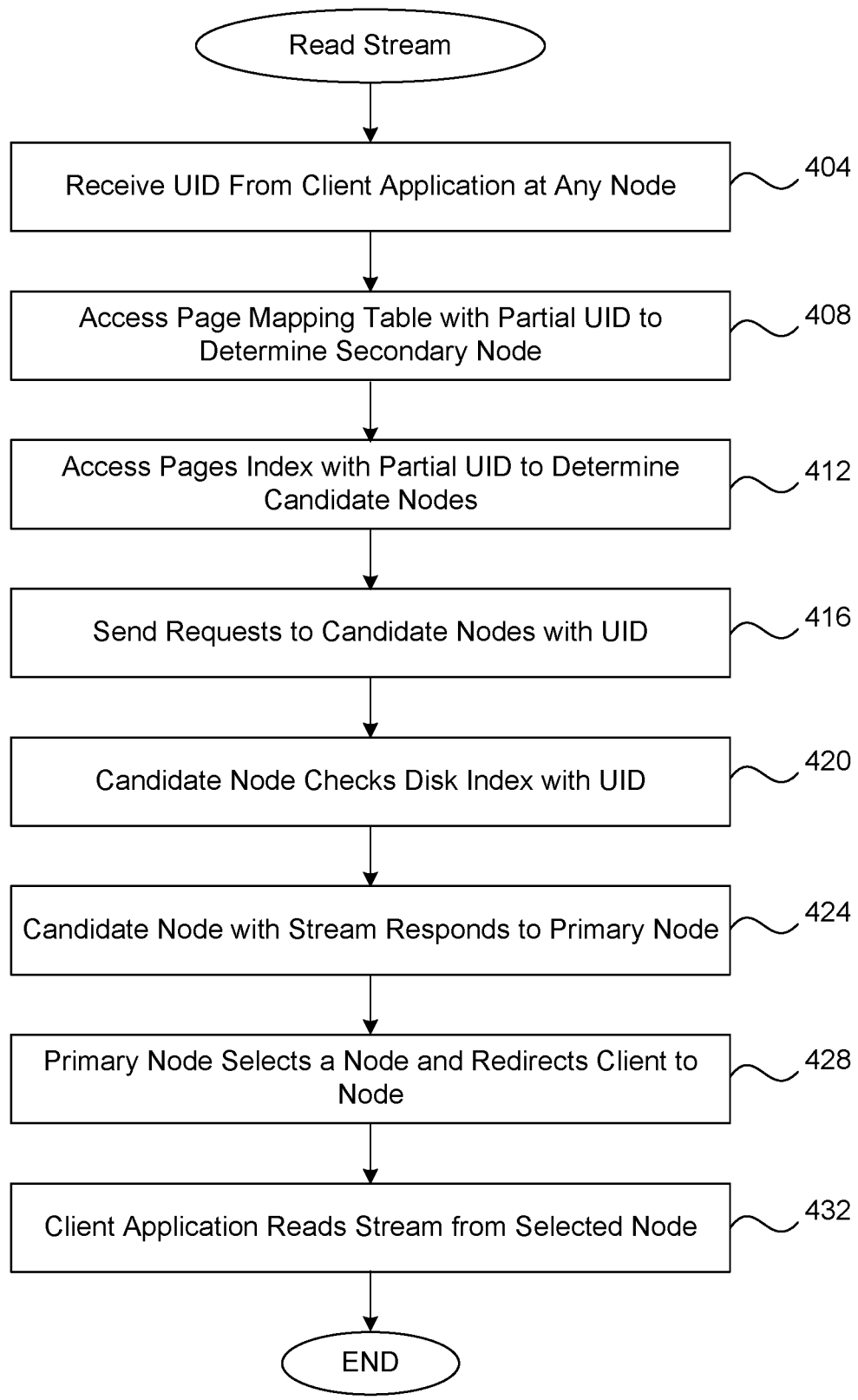
FIG. 4 is a flow diagram describing one embodiment by which a digital object may be read from a storage cluster.

FIG. 4 is a flow diagram describing one embodiment by which a digital object may be read from a storage cluster. A digital object may also be referred to as a stream of bits, and the stream of bits may include the object itself as well as associated metadata. In step 404 a unique identifier for a particular object is received from a client application 130 at any node within the storage cluster 120; this node is termed the primary access node or PAN. The unique identifier should be unique within the cluster and has preferably been generated using a random number generator, although hash functions also work well. In one embodiment the identifier is 128 bits long. The request from the client of the cluster may take any form and use any protocol; in this example, the request is an HTTP request.

In step 408 a first number of bits from the unique identifier is treated as an address range and is used to access the page mapping table of the PAN. In one embodiment, the first 16 bits of the unique identifier are used, resulting in a length for the page mapping table of approximately 65,000 pages (or entries). This address yields a single entry in the page mapping table providing that particular node within the cluster that knows where all the digital objects are stored whose unique identifier begins with the 16 bits used. This particular node is termed the page holder node. Next, in step 412 the page holder node is accessed (and the entire unique identifier is passed along) and its pages index in RAM is identified. The unique identifier (or a portion of the unique identifier) is then used as an index into the pages index to yield one or more candidate nodes that are likely to store the requested digital object identified by the unique identifier. Although it is possible to use the entire unique identifier as entries in the first column of the pages index, and thus provide the precise node (or nodes) where the digital object is located, it is preferable to use a portion of the unique identifier as explained above. In some embodiments, the first four or five bytes may be used, while in very large clusters it may be more desirable to use the first five or six bytes. As discussed above, it is possible that the pages index will yield more than one candidate node where the digital object might be located either due to the inherent uncertainty when using a portion of the unique identifier, or due to the presence of multiple copies of the digital object within the cluster.

Once the candidate nodes have been determined, in step 416 the page holder node sends a request to each candidate node including the entire unique identifier and a communication address for the primary access node. Preferably, the requests are sent in parallel, basically asking each candidate node if it is storing the digital object identified by the unique identifier and to send any positive result back to the primary access node. In step 420, each candidate node then checks its disk index in RAM with the entire unique identifier in order to determine if it is in fact storing the desired digital object. If not, the candidate node takes no action.

If so, then in step 424 the candidate node response to the primary access node with an indication that it does hold the stream identified by the unique identifier. The candidate node also includes a cost to produce that stream for the primary access node. Due to replication of digital objects on different nodes, it is likely that the primary access node will receive more than one positive response along with a cost to retrieve the digital object. In step 428 the primary access node selects one of the responding nodes (based upon the cost provided or other factors) and redirects the pending HTTP request from client application to the selected candidate node. In step 432 the client application is then able to read the desired digital object from the selected candidate node.

Writing a Stream to the Cluster

Figure 5:
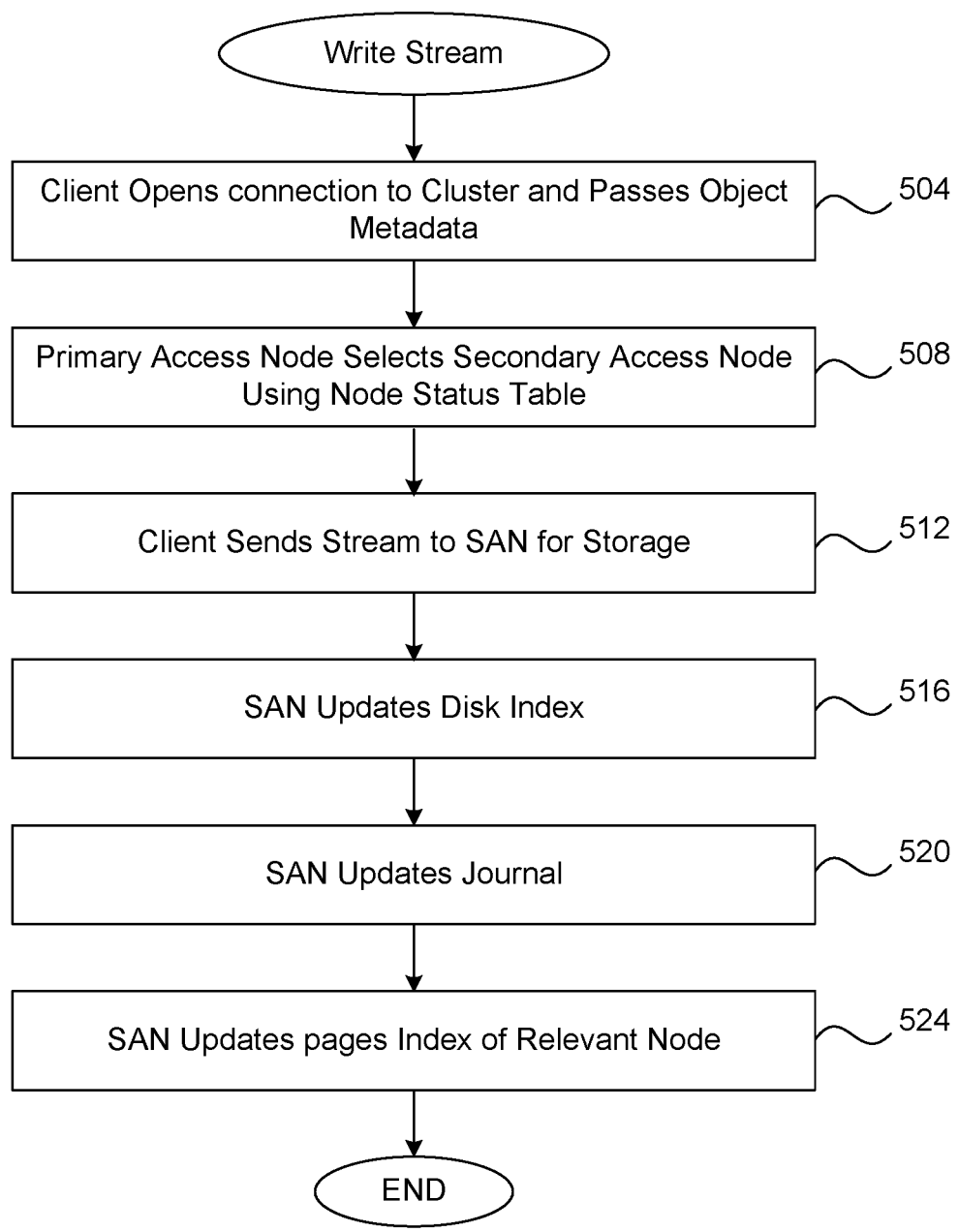
FIG. 5 is a flow diagram describing one embodiment by which a digital object may be written to a storage cluster.

FIG. 5 is a flow diagram describing one embodiment by which a digital object may be written to a storage cluster. In step 504 the client application 130 opens a connection to the storage cluster by accessing any of the nodes of the cluster; the node chosen is referred to as the primary access node or PAN. In one embodiment, the HTTP protocol is used to pass information back and forth. Although the client may pass the digital object to be stored at this time, it is preferable to wait until a node is selected for storage. But, the client may pass object metadata such as the size of the object, whether long-term or short-term storage is desirable, and whether the object will be accessed frequently in the future (all of which can aid in the selection of a storage node), and optionally a file name for the object. Some clients require that a hierarchical file name be used for objects that the client stores within the cluster, and in these situations a hash value may be derived from such a file name and used as the unique identifier. Preferably, though, it is up to the cluster to generate its own unique identifier for the object.

Figure 9:
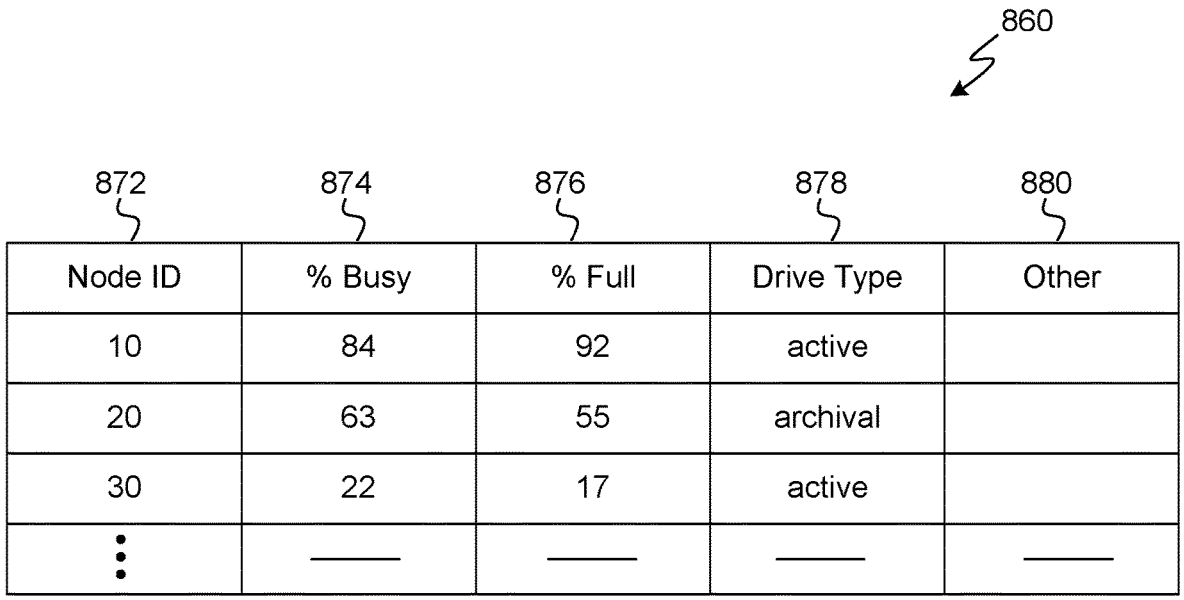
FIG. 9 shows a node status table that may be used.

In step 508 the primary access node selects a secondary access node for storage of the object by using various criteria such as may be found in a node status table. FIG. 9 shows a node status table 860 that may be used. Periodically, each node reports its status to the current designated coordinator node which then sends out the node status table to all nodes; each node will store the node status table in its memory. As shown, the table includes a first column 872 listing an identifier for each node, a column 874 listing how busy the CPU of the node currently is, a column 876 listing how full the disks of the node are, a column 878 listing the type of storage provided by the node, and other columns 880 listing other characteristics of the node such as the amount of RAM available and disk drive spin down status.

The primary access node will select any node within the cluster for storage of the digital object using any criteria at its disposal including that information found in the node status table or a unified metric based thereon. Accordingly, an object may be stored on any node regardless of its unique identifier. At a very simple level, a secondary access node may be chosen for storage at random conditional upon which node is not too busy and has enough space for storage. The metadata of the digital object may be used to determine if a node has enough space to store the digital object, and whether an object to be stored long-term is more suitable for an archival node or an active node. In this example, the primary access node may choose node 30 because it is not too busy, has plenty of room for storage, and is an active node that may be suitable for a digital object that may be accessed relatively frequently in the future. A digital object having metadata indicating that it is unlikely that the object will be accessed in the future may be more suitable for storage on node 20 which is an archival node. It should be noted that the present invention does not need to send a multicast message to all nodes within the cluster (i.e., broadcast a request for status or availability) because the primary access node can simply check the node status table in its own memory to determine which node is suitable for storage.

Once a suitable secondary access node is chosen, the primary access node facilitates an HTTP redirect so that the client application now speaks directly to the secondary access node 30. The client then sends 512 the stream including the digital object to the secondary access node; the secondary access node creates a unique identifier for the object if needed (preferably using a random number generator), stores the stream on one of its disks, and makes note of the unique identifier, the identifier of the volume used, the location on disk, etc. In step 516 the secondary access node updates its disk index in memory, storing the unique identifier, the identifier of the volume used, and the location and length of the digital object on disk. In step 520 the secondary access node updates its journal on disk storing similar information as in the disk index in RAM.

In step 524 it is necessary for the secondary access node 30 to update the pages index of the relevant node that has been tasked with keeping track of the location of particular digital objects that start with certain bits. Accordingly, the secondary access node first determines the relevant portion of the newly generated unique identifier for the object which has just been stored. For example, referring to FIG. 3, if the convention used is that the first 4 bits are relevant to determine an index into the page mapping table, the secondary access node determines the first 4 bits of the newly generated unique identifier and uses its page mapping table to determine which node is responsible for keeping track of those unique identifiers. If the first 4 bits are the hexadecimal character "C" then the secondary access node knows that it is node 40 which is responsible for specifying the location where objects starting with "C" are stored. Accordingly, the secondary access node then sends a single record to node 40 indicating the identifier for the secondary access node 30, that the secondary access node has just stored a new digital object, the unique identifier for that digital object, the volume identifier for the disk on which the object has been stored, and any other relevant information needed to allow node 40 to update its pages index.

Once node 40 receives this information it updates its pages index basically by adding a new row indicating that the digital object identified by the unique identifier is now stored at the secondary access node 30. In one embodiment, the pages index is augmented simply by adding a new row associating the unique identifier (or portion of it) with node 30. Even if an identical row already exists in the pages index a new identical row will still be added. In other words, is not necessary to scan the pages index looking to see if an identical row already exists. Simply adding a row and not bothering to scan the pages index allows for faster updates.

If the storage cluster has a requirement (or the metadata of the object indicates) that multiple copies of the object be kept within the cluster, then this may be accomplished in different manners. In one embodiment, the unique identifier of the digital object is pushed onto a stack of the secondary access node and this node then duplicates the object and stores the duplicate asynchronously on a different node as time permits using the unique identifier for the duplicate. Or, using a process called "replicate on write," the secondary access node immediately stores another copy and does not indicate to the client that the write has been successful until the additional copy (or more) has been made.

Node Failure Recovery

Figure 6:
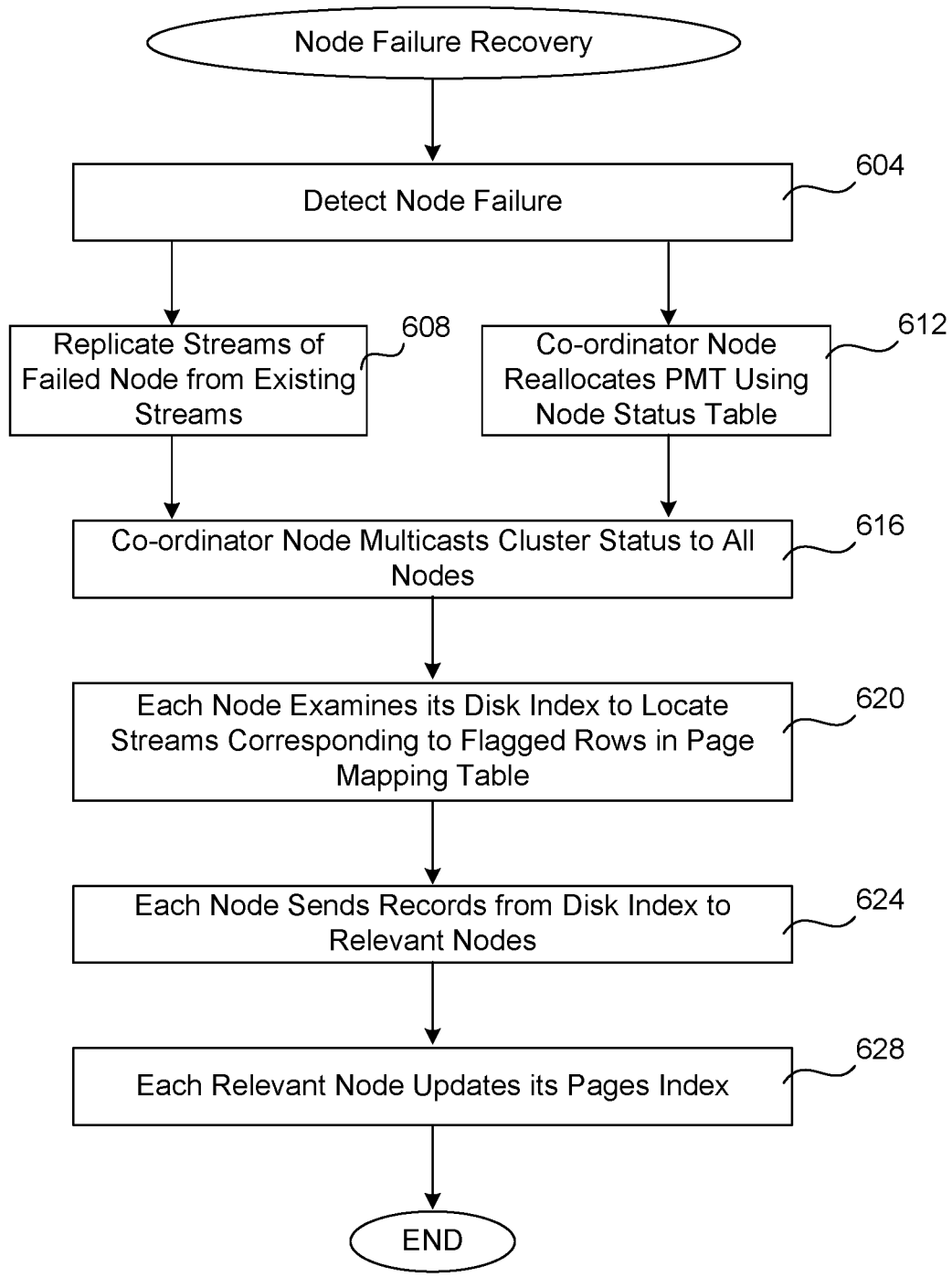
FIG. 6 is a flow diagram describing one embodiment by which the storage cluster may recover if a node or nodes becomes unavailable.

FIG. 6 is a flow diagram describing one embodiment by which the storage cluster may recover if a node or nodes becomes unavailable. This situation may arise for example when a node physically fails (power supply, hardware, disk drive, etc., problem), if its data becomes unavailable for some unknown reason, if its communication link is broken, or if a node is simply being retired. When a node becomes unavailable, not only should its streams be replicated elsewhere within the cluster, but also the page mapping table and pages indexes need to be updated. If the unavailable node did not include a pages index, then updating the page mapping table would not be required. Also, the pages indexes of other nodes would need to be updated with the new locations of streams that had been on the failed node.

In a first step 604 the storage cluster detects that a node has failed or is otherwise unavailable. Detection may occur via a broadcast message to all nodes, via a message sent to a particular node, via an outside entity such as administrative console 140, may be discovered during periodic polling of the status of each node, etc. In one particular embodiment, the designated coordinator node detects a node failure and the identifier for that node in the course of periodic node status checks. Assuming that node 10, for example, has failed, the cluster now needs to replicate streams that had been present on node 10 and reallocate the page mapping table in light of the failure of node 10. These steps may occur serially or in parallel; the below describes parallel operation.

In step 608 any streams that had been present on the failed node 10 should preferably be replicated and stored on other functioning nodes. In a preferred embodiment, each stream is duplicated within the storage cluster such that there are always at least two copies of any stream. Of course, each individual digital object may have its own metadata dictating that more than two replicas be kept within the cluster. In any case, failure of a single node likely means that at least one replica of each digital object formerly present on that node is now missing and needs to be replicated. In the CAStor system available from Caringo, Inc., this is known as Fast Volume Recovery. Missing streams may be identified in any particular manner, and once identified, the remaining replica (or replicas) within a cluster may be replicated once again to create the missing replica. This newly created replica will then be stored upon an existing, functioning node. Similar to steps 508-524, once the replica is created and written the indexes will be updated accordingly.

In order to determine which streams are missing and to find the remaining replicas the following may be used. After any node has concluded that another volume or node is missing, this information is sent to the designated coordinator node which will broadcast the information to all nodes Immediately (or after a parameterized delay) each node will start to iterate over its disk journals (one on each disk), which lists the unique identifiers of all objects present on the disk volume, together with "hints" of the locations i.e., disk volume identifiers where their replicas have last been seen. If the disk volume identifier in a journal hint record corresponds with a disk volume now known to be missing, a replication operation for the pertaining object is triggered to recover the desired replica count in the cluster for that object.

Also, in step 612, the designated coordinator node reallocates the page mapping table using, for example, the node status table 860. Referring back to the page mapping table 210 of FIG. 3, note that node 10 had been responsible for the "0" range and the "2" range. Because node 10 has failed, it is necessary to reallocate these ranges to different nodes within the cluster.

FIG. 10 illustrates a modified page mapping table for use during node failure and when adding a node. Page mapping table 210' is similar to index 210 except that it includes one additional column. The third column indicates whether or not a range has been changed to a different node because of the node failure (or because of addition of a node). The designated coordinator node may choose a new node for each of the ranges shown in rows 662 and 664 using any suitable algorithm; in one particular embodiment, the coordinator node uses the node status table 860 in order to choose suitable nodes. For example, column 880 lists the available RAM of each node which is relevant because choosing a suitable node to take on any of the ranges from the failed node will require a significant amount of RAM to implement the pages index. In this example, rows 662 and 664 indicate that nodes 50 and 20 have been selected to take on the ranges from the failed node 10. (The change in row 666 will be discussed below in the context of adding a new node.) Accordingly, the pages indexes of nodes 50 and 20 will indicate that these nodes now hold the locations of the "0" and "2" ranges. The third column of these two rows has also been flagged to indicate that these rows include new nodes. Of course, if node 10 had not been present in the page mapping table (indicating that node 10 was not responsible for any ranges and did not include a pages index) that it would be unnecessary in step 612 to reallocate the page mapping table.

Next, in step 616 the designated coordinator node multicasts to all of the other nodes within the cluster the cluster status. As mentioned above, the designated coordinator node is responsible for collecting information from nodes in the cluster and periodically broadcasting this information to all nodes. Cluster status includes information such as the page mapping table 210, the node status table 860, the disk-to-node mapping table 810 and other information. Accordingly, the page mapping table 210' with its recent changes will be sent to all nodes within the cluster. Cluster status may be multicast to all nodes every second or so, for example.

In step 620 each node examines its disk index in RAM in order to determine if it is holding any streams having a unique identifier that corresponds to any of the ranges flagged in the newly received page mapping table. (Also, when the designated coordinator node sends volume identifiers of missing disks to all nodes, each node deletes rows in its pages index that refer to those volumes. Replacements will be added organically in due time as the objects get replicated by this method.) In this example, each node determines whether it is holding any streams whose unique identifier begins with "0" or "2" because the pages indexes for these ranges has been moved to nodes 50 and 20, respectively. For example, node 40 may determine that it is currently storing on disk a dozen streams whose unique identifiers all begin with the hexadecimal character "0". Before node 10 failed, node 10 was storing in its pages index the location of these streams because it was responsible for the "0" range. Now, node 50 will be responsible for this range. Each node will preferably gather together batches of these records from its disk index in RAM that correspond to the flagged ranges and send these records to the relevant nodes in step 624. As mentioned earlier, the disk index in RAM may simply be row after row of records, each record holding the unique identifier of each stream stored on disk, the volume identifier, and the stream's location on each disk. Batches of these records will be sent from each node to the node that is taking the place of the failed node. For example, each node will gather a batch of records whose unique identifier starts with the hexadecimal character "2", and send these records to node 20, because it is node 20 which is now responsible for knowing where all the streams are stored whose unique identifier begins with the hexadecimal character "2".

In step 628 each of the nodes that are now taking on the role of any failed node (in this example, nodes 50 and 20) will receive a batch of records from all the other nodes indicating the unique identifiers for the particular range that the node is now responsible for. For example, node 20 will receive batches of records from other nodes indicating unique identifiers beginning with "2". For each record received, the receiving node adds a row to its pages index. For example, node 20 will simply add a row to its pages index 222 for each record received, and likewise for node 50. Accordingly, the pages index that had been held by failed node 10 has now been distributed to the pages indexes of nodes 50 and 20.

Once the designated coordinator node receives an indication from each node that each node is aware of the newly flagged nodes and has started the process of examining its disk index in RAM, the coordinator node may remove the check marks in the third column of its page mapping table.

Addition of a Node

Figure 7:
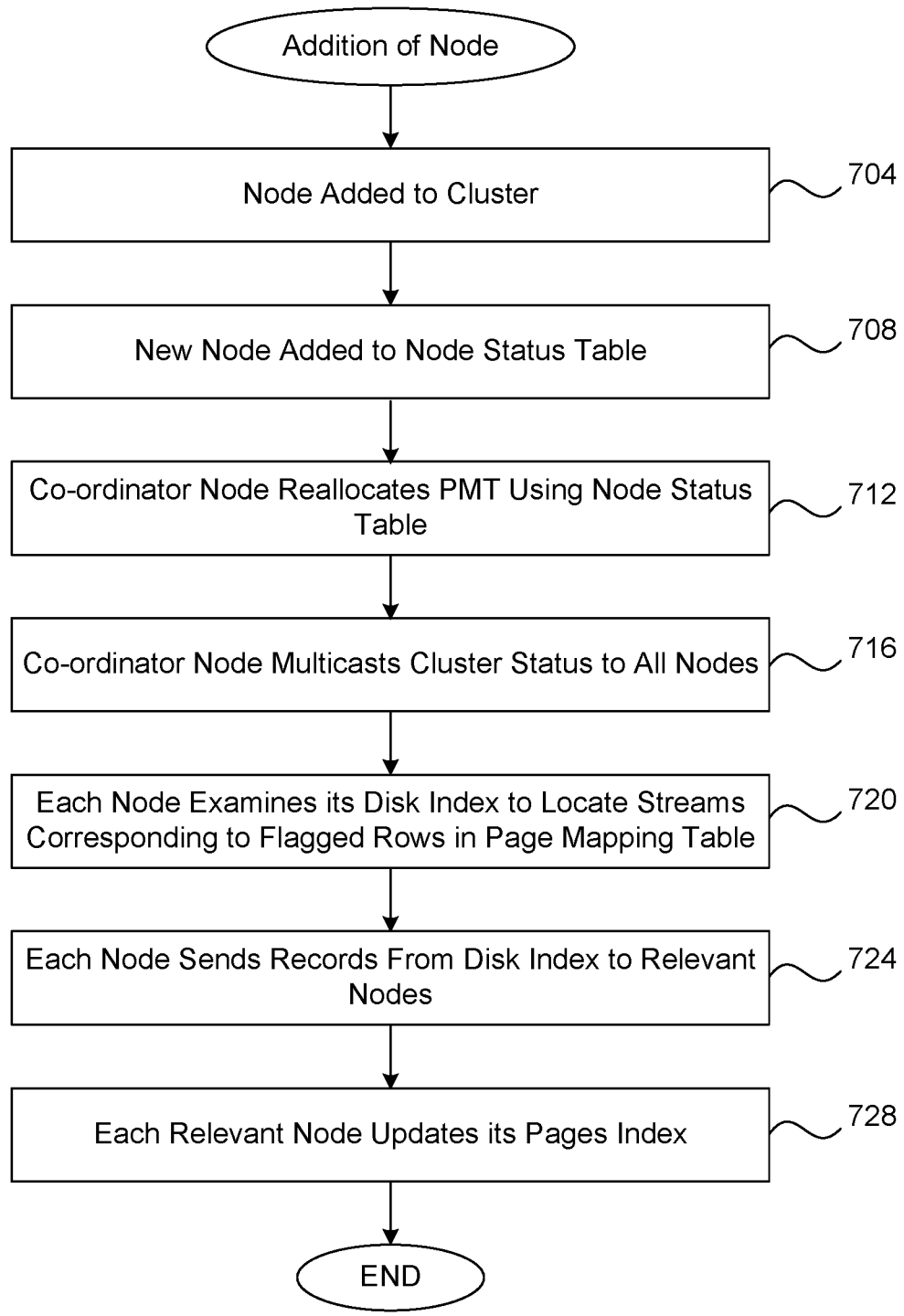
FIG. 7 is a flow diagram describing one embodiment by which a node or nodes may be added to the storage cluster.

FIG. 7 is a flow diagram describing one embodiment by which a node or nodes may be added to the storage cluster. In this embodiment, the cluster is functioning normally and a new node with or without disks is desired to be added either to store more digital objects or to provide more RAM for a pages index. It is possible that if the existing nodes are low in RAM that an additional node or nodes may be added simply to provide more RAM for a pages index to be stored on the new node.

In step 704 a new node (for instance, node 90) is added to the cluster, its disks (if any) are formatted, and it is adopted into the cluster and communication is established normally. As part of periodic communication from each node to the designated coordinator node, the new node 90 will then communicate to the coordinator node that the new node is present and available for use. As part of this process, the coordinator node will update its disk-to-node mapping table 810 with information from the new node.

In step 708, the coordinator node adds the new node and its information to its node status table 860. For example, a new row is added indicating the node identifier 90 and other relevant information for that table. In step 712 the coordinator node reallocates its page mapping table using the information from the node status table. Because node 90 is new, and likely has plenty of RAM available, it is likely that one or many of the ranges from the page mapping table may be assigned to this new node. Of course, if the new node has been added solely to add more disk space, it is not required that the new node hold a pages index. In a preferred embodiment, though, the coordinator node attempts to proportionally allocate all of the page ranges over all of the available nodes, using, for example, the amount of available RAM in each node as a guideline. For example, the coordinator node may attempt to allocate the page ranges in the page mapping table such that the percentage of RAM used in each node is approximately the same. Referring to the page mapping table 210' of FIG. 10, note that row 666 has been changed. Previously, the "E" range of unique identifiers had been assigned to node 50, but now the coordinator node has reallocated that range and has assigned it to new node 90. Accordingly, that row has been flagged by the addition of a checkmark or some other similar mechanism. This flagging will indicate to all nodes within the cluster that it is now node 90 (rather than node 50) that now holds the pages index for the range of unique identifiers beginning with "E". This pages index on node 90 will indicate on which nodes the streams corresponding to these unique identifiers are stored.

Next, in step 716 the designated coordinator node multicasts to all of the other nodes within the cluster the cluster status. As mentioned above, the designated coordinator node is responsible for collecting information from nodes in the cluster and periodically broadcasting this information to all nodes. Cluster status includes information such as the page mapping table 210, the node status table 860, the disk-to-node mapping table 810 and other information. Accordingly, the page mapping table 210' with any recent changes will be sent to all nodes within the cluster.

In step 720 each node examines its disk index in RAM in order to determine if it is holding any streams having a unique identifier that corresponds to any of the ranges flagged in the newly received page mapping table. In this example, each node determines whether it is holding any streams whose unique identifier begins with "E" because the pages index for this range has been moved to node 90. For example, node 30 may determine that it is currently storing on disk four streams whose unique identifiers all begin with the hexadecimal character "E". Before node 90 was added, node 50 was storing in its pages index the location of these streams because it was responsible for the "E" range. Now, node 90 will be responsible for this range. Each node will preferably gather together batches of these records from its disk index in RAM that correspond to the flagged range and send these records to the relevant node in step 724. As mentioned earlier, the disk index in RAM may simply be row after row of records, each record holding the unique identifier of each stream stored on disk, the volume identifier, and the stream's location on each disk. Batches of these records will be sent from each node to the new node that has been added. For example, each node will gather a batch of records whose unique identifiers starts with the hexadecimal character "E", and send these records to node 90, because it is node 90 which is now responsible for knowing where all the streams are stored whose unique identifier begins with the hexadecimal character "E".

In step 728 each of the newly added nodes (in this example, node 90) will receive a batch of records from all the other nodes indicating the unique identifiers for the particular range that the node is now responsible for. For example, node 90 will receive batches of records from other nodes indicating unique identifiers beginning with "E". For each record received, the receiving node adds a row to its pages index. For example, node 90 will simply add a row to its pages index 222 for each record received. Accordingly, the range "E" that had been held by node 50 has now been distributed to the pages index of node 90.

Once the designated coordinator node receives an indication from each node that each node is aware of the newly flagged nodes and has started the process of examining its disk index in RAM, the coordinator node may remove the check marks in the third column of its page mapping table. Once the new node has been added it is available to store streams from a client application or to store streams from other nodes within the cluster that wish to create more replicas or to move a stream from node to node.

Alternatively, since node 50 already holds the pages for range "E", it may be simpler to move the "E" portion of the pages index from node 50 to the pages index of node 90, rather than requiring each node to send records.

Alternative Address Ranges

FIG. 3 shows that the first portion 312 of the unique identifier is used as an index into the page mapping table. But, it is not necessary that the first portion of a unique identifier be used as an index. For example, it is also possible to use the last portion of the unique identifier or some interior portion. Similar to the portion 312 of the unique identifier 201 shown in FIG. 3, the last four bits of the unique identifier (which value would also represent one of the 16 hexadecimal digits) may be used as a key into the page mapping table. The pages index may then list entire unique identifiers, or partial unique identifiers ending with the key. Similarly, the middle four bits of the unique identifier 201 may also be used as a key into the page mapping table to divide up the address space into address ranges.

Combined Pages Index and Disk Index in RAM

In one embodiment, the disk index stored in RAM by each node may be combined with the pages index of each node. If the pages index of the node lists the entire unique identifier in its first column, it would be straightforward to include the disk index within the pages index as well. For example, if a digital object is stored upon the node in question, its entry within the pages index would indicate its unique identifier followed by the identifier of the node in question.

If the pages index of the node does not list the entire unique identifier (producing some uncertainty as described above), then it still may be possible to list the entire unique identifier only for those digital objects that are stored upon the node in question.

Computer System Embodiment

Figure 11A:
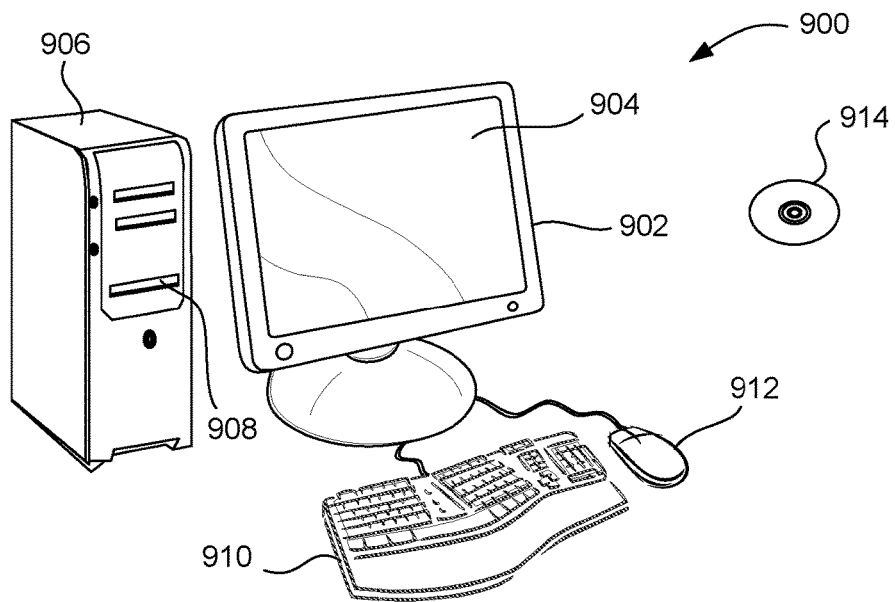
FIGS. 11A and 11B illustrate a computer system suitable for implementing embodiments of the present invention.
Figure 11B:
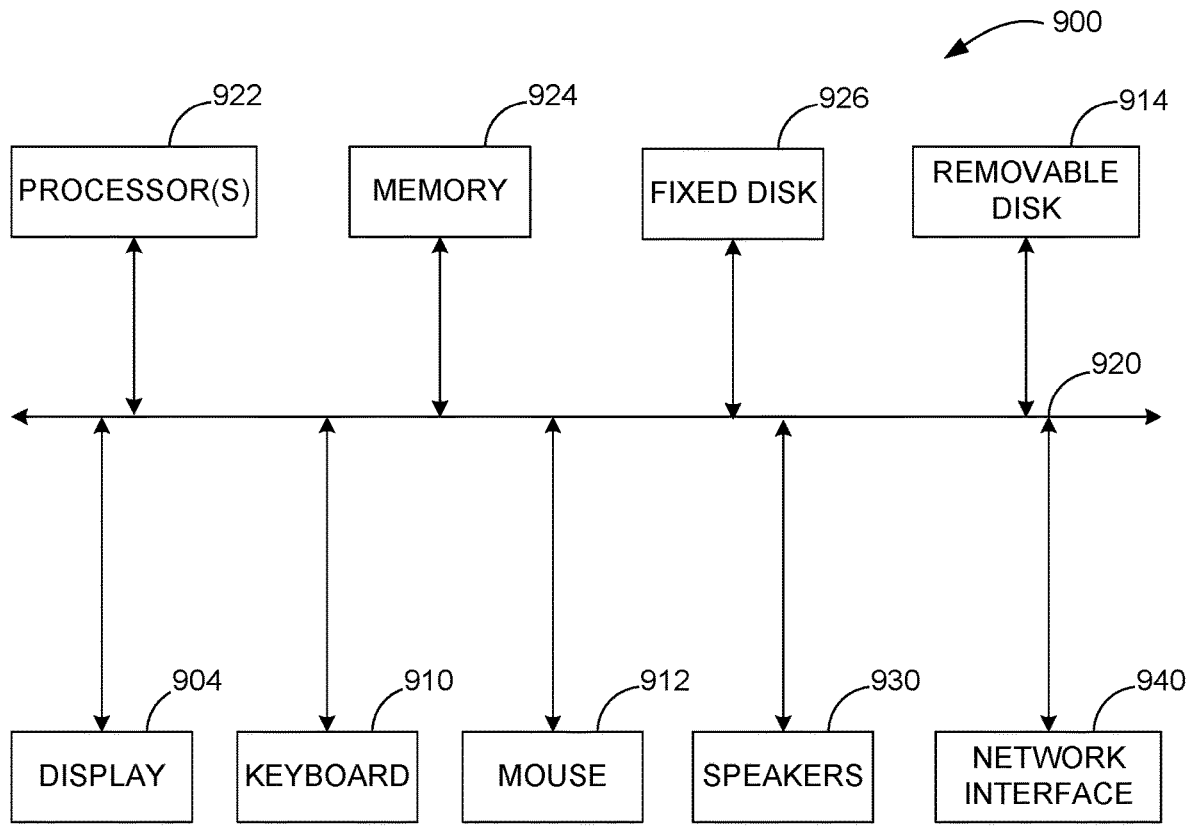

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of reading a digital object from a fixed-content storage cluster, said method comprising:
   receiving a unique identifier at a first computer node within a storage cluster having a plurality of computer nodes, said storage cluster including stored digital objects in persistent storage, each of said digital objects being identified by a unique identifier and each of said unique identifiers only identifying a single digital object in said fixed-content storage cluster;
   identifying a first portion of said unique identifier, said first portion having a value within a range of all possible values;
   mapping said value indicated by said first portion of said unique identifier to identify a second computer node;
   accessing a disk index in RAM on said second computer node using at least a second portion of said unique identifier to identify information indicating a storage location where said digital object is stored, said disk index including unique identifiers of digital objects stored on said second computer node and locations on disk of said digital objects;
   reading said digital object identified by said unique identifier from a third computer node and returning said digital object to a software application.

2. The method as recited in claim 1 wherein said storage cluster is a write-once read-many (WORM) fixed-content storage cluster.

3. The method as recited in claim 1 wherein
   accessing said second disk index on said second computer node using said unique identifier identifies all computer nodes within said storage cluster where said digital object is stored.

4. The method as recited in claim 1 wherein said steps of claim 1 other than said reading step do not require a disk access.

5. The method as recited in claim 1 wherein accessing said second disk index further includes:
   mapping said at least a second portion of said unique identifier to a volume identifier identifying a disk within said storage cluster; and
   mapping said volume identifier to said third computer node.

6. The method as recited in claim 1 wherein said information identifies said third computer node.

7. The method as recited in claim 1 wherein said first, second and third computer nodes are the same node.

8. A method of recovering from a node failure within a storage cluster, said method comprising:
   detecting within said storage cluster that a first computer node out of a plurality of computer nodes is unavailable, said storage cluster including stored digital objects in persistent storage, each of said digital objects being identified by a unique identifier (UID), and wherein said unique identifiers having ranges of possible values, wherein a first UID range being mapped to said first computer node;
   replacing said mapping of said first UID range to said first computer node with a mapping of said first UID range to a second computer node within said storage cluster different from said first computer node;
   causing each computer node within said storage cluster other than said first computer node to determine a set of unique identifiers falling within said first UID range indicating digital objects stored upon said each computer node;
   receiving, at said second computer node from said each computer node, said sets that identify said unique identifiers and said each computer nodes where the digital objects corresponding to said unique identifiers are stored; and
   updating a disk index in RAM on said second computer node to hold information indicating storage locations where said digital objects corresponding to said unique identifiers are stored, said disk index including unique identifiers of digital objects stored on said second computer node and locations on a disk of said second computer node of said digital objects that are stored on said second computer node.

9. The method as recited in claim 8 wherein said storage cluster is a write-once read-many (WORM) fixed-content storage cluster.

10. The method as recited in claim 8 wherein said steps of claim 8 do not require a disk access.

11. The method as recited in claim 8 wherein said information identifies said each computer nodes where said digital objects corresponding to said unique identifiers are stored.

12. The method as recited in claim 8 wherein said first UID range being mapped to said first computer node in a table of said storage cluster, and wherein said replacing occurs in said table.

13. A non-transitory computer-readable medium comprising computer code for reading a digital object from a fixed-content storage cluster, said computer code of said computer-readable medium executable by a machine to perform the following:
   receiving a unique identifier at a first computer node within a storage cluster having a plurality of computer nodes, said storage cluster including stored digital objects in persistent storage, each of said digital objects being identified by a unique identifier and each of said unique identifiers only identifying a single digital object in said fixed-content storage cluster;
   identifying a first portion of said unique identifier, said first portion having a value within a range of all possible values;
   mapping said value indicated by said first portion of said unique identifier to identify a second computer node;
   accessing a disk index in RAM on said second computer node using at least a second portion of said unique identifier to identify information indicating a storage location where said digital object is stored, said disk index including unique identifiers of digital objects stored on said second computer node and locations on disk of said digital objects;
   reading said digital object identified by said unique identifier from a third computer node and returning said digital object to a software application.

14. The computer-readable medium as recited in claim 13 wherein said storage cluster is a write-once read-many (WORM) fixed-content storage cluster.

15. The computer-readable medium as recited in claim 13 wherein accessing said second disk index on said second computer node using said unique identifier identifies all computer nodes within said storage cluster where said digital object is stored.

16. The computer-readable medium as recited in claim 13 wherein said steps of claim 13 other than said reading step do not require a disk access.

17. The computer-readable medium as recited in claim 13 wherein accessing said second disk index further includes computer code to perform the following:
   mapping said at least a second portion of said unique identifier to a volume identifier identifying a disk within said storage cluster; and
   mapping said volume identifier to said third computer node.

18. The computer-readable medium as recited in claim 13 wherein said information identifies said third computer node.

19. The computer-readable medium as recited in claim 13 wherein said first, second and third computer nodes are the same node.

20. A non-transitory computer-readable medium comprising computer code for recovering from a node failure in a storage cluster, said computer code of said computer-readable medium executable by a machine to perform the following:
   detecting within said storage cluster that a first computer node out of a plurality of computer nodes is unavailable, said storage cluster including stored digital objects in persistent storage, each of said digital objects being identified by a unique identifier (UID), and wherein said unique identifiers having ranges of possible values, wherein a first UID range being mapped to said first computer node;
   replacing said mapping of said first UID range to said first computer node with a mapping of said first UID range to a second computer node within said storage cluster different from said first computer node;
   causing each computer node within said storage cluster other than said first computer node to determine a set of unique identifiers falling within said first UID range indicating digital objects stored upon said each computer node;
   receiving, at said second computer node from said each computer node, said sets that identify said unique identifiers and said each computer nodes where the digital objects corresponding to said unique identifiers are stored; and
   updating a disk index in RAM on said second computer node to hold information indicating storage locations where said digital objects corresponding to said unique identifiers are stored, said disk index including unique identifiers of digital objects stored on said second computer node and locations on a disk of said second computer node of said digital objects that are stored on said second computer node.

21. The computer-readable medium as recited in claim 20 wherein said storage cluster is a write-once read-many (WORM) fixed-content storage cluster.

22. The computer-readable medium as recited in claim 20 wherein said steps of claim 20 do not require a disk access.

23. The computer-readable medium as recited in claim 20 wherein said information identifies said each computer nodes where said digital objects corresponding to said unique identifiers are stored.

24. The computer-readable medium as recited in claim 20 wherein said first UID range being mapped to said first computer node in a table of said storage cluster, and wherein said replacing occurs in said table.

* * * * *